United States Patent
Kneidel

(10) Patent No.: US 10,992,561 B2
(45) Date of Patent: Apr. 27, 2021

(54) MEASURING DEVICE AND MEASURING METHOD FOR OFDMA TESTING

(71) Applicant: Rohde & Schwarz GmbH & Co. KG, Munich (DE)

(72) Inventor: Thomas Kneidel, Fuerstenfeldbruck (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 0 days.

(21) Appl. No.: 15/902,176

(22) Filed: Feb. 22, 2018

(65) Prior Publication Data
US 2019/0260656 A1  Aug. 22, 2019

(51) Int. Cl.
*H04W 56/00* (2009.01)
*H04L 12/26* (2006.01)
*H04L 5/00* (2006.01)
*H04L 27/00* (2006.01)
*H04W 84/04* (2009.01)
*H04W 84/12* (2009.01)

(52) U.S. Cl.
CPC .......... *H04L 43/087* (2013.01); *H04L 5/0007* (2013.01); *H04L 27/0008* (2013.01); *H04W 84/042* (2013.01); *H04W 84/12* (2013.01)

(58) Field of Classification Search
CPC ... H04L 43/087; H04L 5/007; H04L 27/0008; H04W 84/042; H04W 84/12
USPC ........................................................ 370/252
See application file for complete search history.

(56) References Cited

U.S. PATENT DOCUMENTS

| | | | | |
|---|---|---|---|---|
| 8,478,263 | B1* | 7/2013 | Lan | H04W 24/08 455/423 |
| 2007/0230356 | A1* | 10/2007 | Kalantri | H04W 24/06 370/241 |
| 2008/0177488 | A1* | 7/2008 | Niitsuma | G01R 21/133 702/60 |
| 2009/0157936 | A1* | 6/2009 | Goss | G06F 9/4812 710/264 |
| 2011/0299570 | A1* | 12/2011 | Reed | H04B 17/0085 375/130 |
| 2012/0176919 | A1* | 7/2012 | Callender | H04W 24/00 370/252 |
| 2016/0080511 | A1* | 3/2016 | Baum | H04B 17/318 370/338 |
| 2016/0212641 | A1* | 7/2016 | Kong | H04B 17/0087 |

(Continued)

*Primary Examiner* — Sai Ming Chan
(74) *Attorney, Agent, or Firm* — Potomac Technology Law, LLC

(57) ABSTRACT

A measuring device for performing an Orthogonal Frequency Division Multiple Access (OFDMA) test on a device under test is provided. The measuring device comprises a first emulator adapted to emulate a first station for communicating with the device under test. The measuring device further comprises a second emulator adapted to emulate a second station for communicating with the device under test. The measuring device further comprises a controller adapted to configure the first and second emulators. The configuration by the controller comprises configuring at least one of the first and second emulators with respect to one or more of a modulation scheme, a data rate, an emulation of one or more specific applications, a signal strength, an output power, a deterioration of received packets, and a reply failure rate with regard to received packets.

18 Claims, 3 Drawing Sheets

(56) References Cited

U.S. PATENT DOCUMENTS

2017/0126450 A1   5/2017  Stott
2018/0269939 A1*  9/2018  Hu ..................... H04B 7/0456

* cited by examiner

MEASURING DEVICE AND MEASURING METHOD FOR OFDMA TESTING

TECHNICAL FIELD

The invention relates to measuring the behavior of a device under test, such as a wireless local area network (WLAN) access point, using Orthogonal Frequency Division Multiple Access (OFDMA).

BACKGROUND

The WLAN 802.11ax standard offers a broad bandwidth which can be split among two or more stations (STA, clients), which is a new feature with regard to the older 11ac standard. This new feature is also known as Orthogonal Frequency Division Multiple Access (OFDMA).

Currently, no wireless communication tester is available that is able to verify OFDMA functionality of 802.11ax-access points (APs) under close to reality conditions.

Only as a general background, the document US20170126450A1 shows a trigger information exchange between wireless systems, and OFDMA is shown therein.

Accordingly, there is a need for a measuring approach that facilitates OFDMA testing under conditions representative of real-world conditions.

SOME EXAMPLE EMBODIMENTS

Embodiments of the present invention advantageously address the foregoing requirements and needs, as well as others, by providing a measuring device and measuring method that facilitate OFDMA testing under conditions representative of real-world conditions.

According to a first aspect of the present invention, a measuring device for performing an OFDMA test on a device under test is provided. The measuring device comprises a first station emulator, adapted to emulate a first station communicating with the device under test, a second station emulator, adapted to emulate a second station communicating with the device under test, and a controller, adapted to configure the station emulators. The configuration by the controller comprises configuring at least one of the station emulators with respect to at least one of a modulation scheme, a data rate, an emulation of specific applications, a signal strength, an output power, a deterioration of packets received by the station emulators, and a reply failure rate with regard to packets received by the station emulators. This allows for a measuring of the OFDMA behavior of the device under test under conditions representative of real-world conditions.

According to a second aspect of the present invention, a measuring method for performing an OFDMA test on a device under test is provided. The measuring method comprises emulating a first station communicating with the device under test, emulating a first station communicating with the device under test, and configuring the emulated stations. The configuring the emulated stations comprises configuring at least one of the emulated station communications to at least one of a modulation scheme, a data rate, an emulation of specific applications, a signal strength, an output power, a deterioration of packets received by the station emulators, a reply failure rate with regard to packets received by the station emulators. This also allows for a testing of the device under test under conditions representative of real-world conditions.

According to an implementation form of the first and second aspects of the present invention, the device under test comprises an OFDMA communication device, a non-cellular access point, and/or a cellular base station. A high measuring flexibility is thereby achieved.

According to a further implementation form of the first and second aspects of the present invention, the device under test comprises a 802.11ax WLAN access point or a gNodeB. This allows for a further increase in measuring flexibility.

According to a further implementation form of the first and second aspects of the present invention, the controller is adapted to configure the first station emulator and/or the second station emulator to set an SSID and/or a MAC address. This further increases the number of available measuring parameters.

According to a further implementation form of the first and second aspects of the present invention, the controller is adapted to configure the first station emulator and the second station emulator to each emulate a WLAN 11ax station, which set up connections to the device under test. This allows for a testing of devices under test being wireless local area network (WLAN) access points.

According to a further implementation form of the first and second aspects of the present invention, the controller is adapted to dynamically reconfigure the first station emulator and the second station emulator to dynamically reconfigure the emulated WLAN 11ax stations, forcing the device under test to adapt its OFDMA settings. This dynamic reconfiguration allows the test conditions to be further representative of real world environment.

According to a further implementation form of the first and second aspects of the present invention, the measuring device comprises a plurality of station emulators. This allows for a measuring environment further representative of real world environment.

According to a further implementation form of the first and second aspects of the present invention, the first station emulator and the second station emulator are configured to perform an OFDMA communication with the device under test, and the measuring device is adapted to monitor a standard compliance of the OFDMA communication by the device under test. This allows for automatically determining the standard-conformity of the device under test, which provides for enhanced efficiency and considerably reduces required efforts.

According to a further implementation form of the first and second aspects of the present invention, the configuration by the controller comprises configuring at least one of the station emulators to specific quality of service parameters, such as delay and/or jitter. This allows for a further increase in the number of available measuring parameters.

According to a further implementation form of the first and second aspects of the present invention, the modulation schemes comprise BPSK, QPSK, QAM or 1024 QAM. This further increases the flexibility of measurement.

According to a further implementation form of the first and second aspects of the present invention, the specific application comprises web browsing http, sending email SMTP, and/or video streaming. This allows for testing the device under test under conditions further representative of real-world conditions.

Still other aspects, features, and advantages of the present invention are readily apparent from the following detailed description, simply by illustrating a number of particular embodiments and implementations, including the best mode contemplated for carrying out the present invention. The present invention is also capable of other and different embodiments, and its several details can be modified in various obvious respects, all without departing from the spirit and scope of the present invention. Accordingly, the drawing and description are to be regarded as illustrative in nature, and not as restrictive.

BRIEF DESCRIPTION OF THE DRAWINGS

Embodiments of the present invention are illustrated by way of example, and not by way of limitation, in the figures of the accompanying drawings, in which like reference numerals refer to similar elements, and in which.

DETAILED DESCRIPTION

Figure 1:
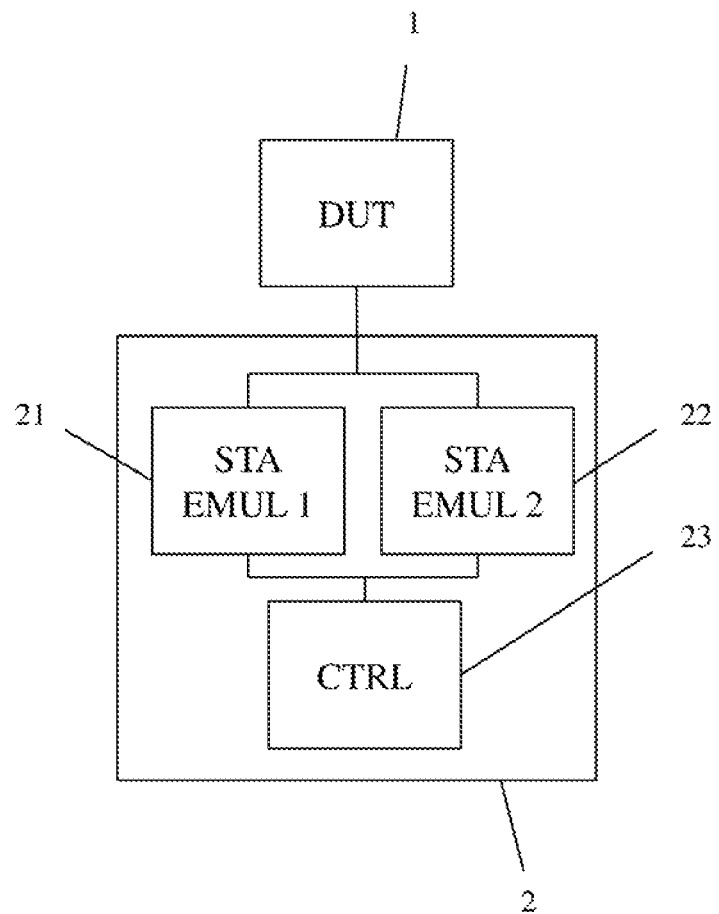
FIG. 1 shows a measuring device for performing an OFDMA test on a device under test, in accordance with example embodiments of the present invention.

A measuring device and measuring method that facilitate OFDMA testing under conditions representative of real-world conditions are described. In the following description, for the purposes of explanation, numerous specific details are set forth in order to provide a thorough understanding of the invention. It is apparent, however, that the invention may be practiced without these specific details or with an equivalent arrangement. In other instances, well-known structures and devices are shown in block diagram form in order to avoid unnecessarily obscuring the invention.

As will be appreciated, a processor, unit, module or component (as referred to herein) may be composed of software component(s), which are stored in a memory or other computer-readable storage medium, and executed by one or more processors or CPUs of the respective devices. As will also be appreciated, however, a module or unit may alternatively be composed of hardware component(s) or firmware component(s), or a combination of hardware, firmware and/or software components. Further, with respect to the various example embodiments described herein, while certain of the functions are described as being performed by certain components or modules (or combinations thereof), such descriptions are provided as examples and are thus not intended to be limiting. Accordingly, any such functions may be envisioned as being performed by other components or modules (or combinations thereof), without departing from the spirit and general scope of the present invention. Moreover, the methods, processes and approaches described herein may be processor-implemented using processing circuitry that may comprise one or more microprocessors, application specific integrated circuits (ASICs), field programmable gate arrays (FPGAs), or other devices operable to be configured or programmed to implement the systems and/or methods described herein. For implementation on such devices that are operable to execute software instructions, the flow diagrams and methods described herein may be implemented in processor instructions stored in a computer-readable medium, such as executable software stored in a computer memory store.

An example implementation and function of a measuring device according to example embodiments of the present invention are described with reference to FIG. 1. Further details of the function are described with reference to FIG. 2. Further, an example measuring method according to example embodiments of the present invention are described with reference to FIG. 3. Similar entities and reference numbers in different figures have been partially omitted.

Reference will now be made in detail to example embodiments of the present invention, examples of which are illustrated in the accompanying drawings. However, the following embodiments of the present invention may be variously modified and the range of the present invention is not limited by the following embodiments.

Access Points (AP) should be tested whether they properly support OFDMA. Ideally these tests should run under conditions representative of real-world conditions. Depending on the changing radio and network conditions, the AP has to adapt the size of assigned bandwidth and used modulation coding scheme (data rate) with each of the connected stations. These tests should be reproducible and free and dynamically programmable.

In contrast to commercial 11ax-STAtions, a wireless communication tester is be able to change RF and network parameters, like transmit power level, media access control (MAC) address, service set identifier (SSID), data throughput and quality-of-service parameters (delay, jitter, etc.). Such tests should be reproducible and run under lab conditions. Such a test setup would be able to simulate extreme test scenarios and check and verify proper function of 11ax-APs even under rough stress conditions.

FIG. 1 shows a measuring device 2 for performing an OFDMA test on a device under test, in accordance with example embodiments of the present invention. The measuring device is connected to a device under test 1 (e.g., a WLAN access point, such as in accordance with the 802.11ax standard, or a next generation wireless network communications node (NodeB) or gNodeB. In any case, the device under test is OFDMA compatible, which means that it can perform OFDMA communications.

The device under test may comprise an OFDM communication device, a non-cellular access point, and/or a cellular base station. The device under test may comprise an 802.11ax WLAN access point or a gNodeB.

The measuring device 2 comprises a first station emulator 21, a second station emulator 22, and a controller 23. The station emulators 21, 22 are connected to the controller 23.

Only components of the measuring device relevant to the described embodiments of the present invention are displayed and described in detail herein. For example, the measuring device 2 can also comprise other components, such as an input/output device, such as a display, keyboard, and/or a mouse.

Also, differentiation between high-frequency components, analog low-frequency components and digital components is omitted. By way of example, in practice, each station emulator 21, 22 may comprise a combination of high-frequency components, low-frequency components and digital components. By way of further example, the controller 23 may operate in a digital manner.

Further, according to example embodiments, the first station emulator 21 and the second station emulator 22 may be implemented using shared hardware. By way of example, a single high-frequency unit of the measuring device may be used to produce and receive the signals for the first station emulator 21 and the second station emulator 22.

In order to perform a measurement, a device under test 1 is connected to the station emulators 21, 22. By way of example, such a connection may be via a wired or wireless connection. In the present embodiment, the device under test 1 and the measuring device 2 comprise respective antennas for wireless communication.

When performing a measurement, the measuring device 2, controlled by the controller 23, controls the station emulators 21, 22 to each emulate a station communicating with the device under test 1. If the device under test 1, for example, is a WLAN access point, the emulated stations are participants within the WLAN communications.

The configuration by the controller 23 comprises configuring at least one of the station emulators 21, 22 to at least one of a modulation scheme, a data rate, an emulation of specific applications, a signal strength, an output power, a deterioration of packets received by the station emulators, and a reply failure rate with regard to packets received by the station emulators. Also, a configuration to a specific SSID and/or MAC address is possible. Further, a configuration of quality of service parameters, such as a delay or a jitter is also possible.

The above-mentioned modulation schemes may be BPSK, QPSK, QAM or 1024 QAM. Any other known modulation schemes can also be employed.

Further, the above-mentioned specific applications may comprise web browsing (e.g., via http), sending e-mail (e.g., via simple mail transfer protocol (SMTP)), and video streaming, or any other known application.

In order to measure the OFDMA performance of the device under test, the controller configures the first station emulator 21 and the second station emulator 22 to each emulate a WLAN 11ax station, which sets up communications with the device under test. When simultaneous communications between the device under test and the two configured stations happen, this is done via OFDMA. This is also shown in FIG. 2.

Moreover, although here only two station emulators 21, 22 are depicted, more than two stations emulators can be used in practice—e.g., 3, 4, 5, 6, 7, 8, 9, 10 or more station emulators are possible.

Figure 2:
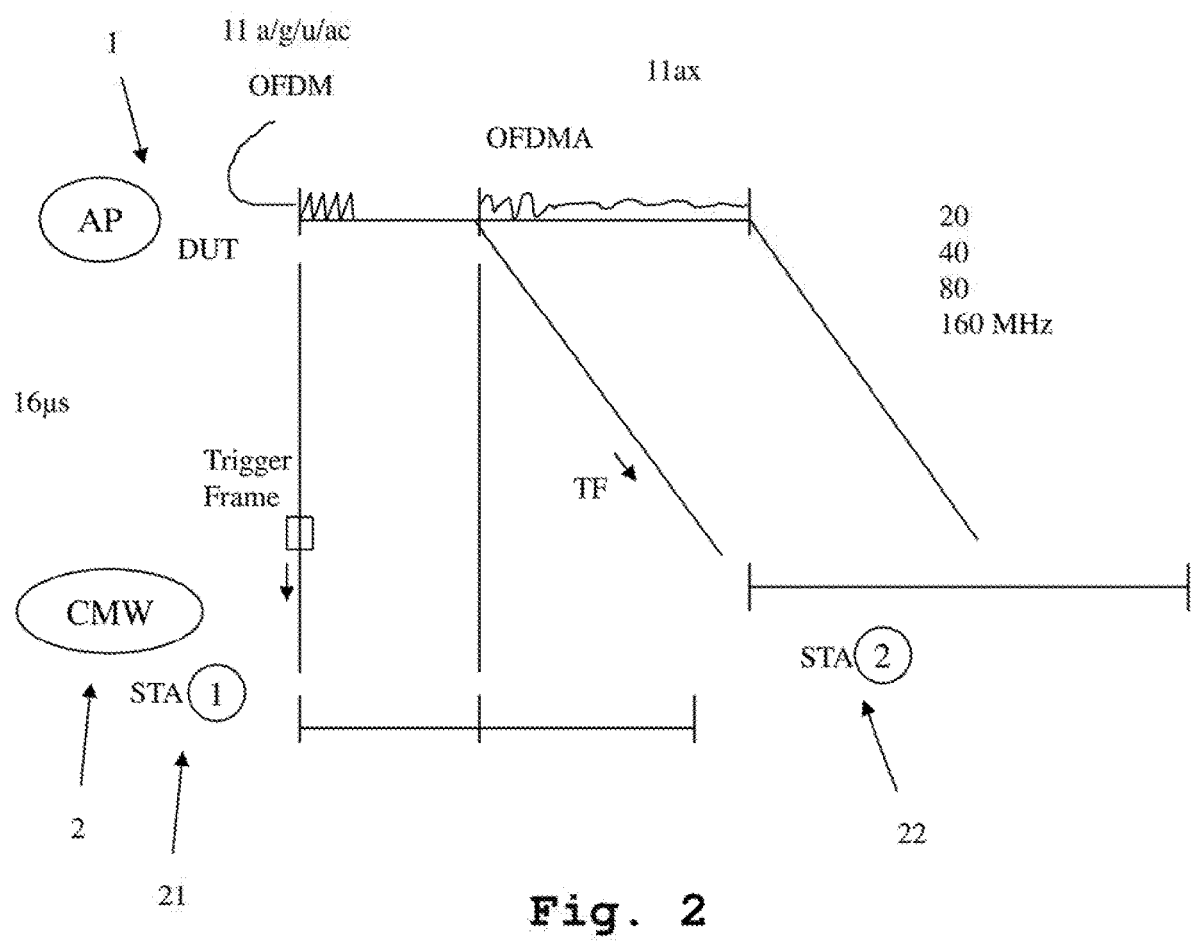
FIG. 2 shows a diagram depicting messages between the device under test and emulated stations, in accordance with example embodiments of the present invention.

FIG. 2 shows a diagram depicting messages between the device under test and emulated stations, in accordance with example embodiments of the present invention. With reference to FIG. 2, the signaling between different entities are shown. By way of example, the signaling between a WLAN access point (device under test (DUT) 1) and two station emulators 21, 22, which emulate stations, are shown. Initially, only OFDM communications between the device under test 1 and the first station emulator 21 occur. This communication is initiated by a trigger frame. When the second station emulated by the station emulator 22 commences communication, which is also triggered by a trigger frame, a switch to OFDMA occurs in order to share the resources.

By way of example, the OFDM communication is specified by the WLAN standards 802.11a/g/u/ac, while the OFDMA communication standard is only specified by the WLAN standard 802.11ax.

By way of further example, a plurality of different frequencies can be used for the communications, such as communications at 20, 40, 80 or 160 MHz are possible.

Figure 3:
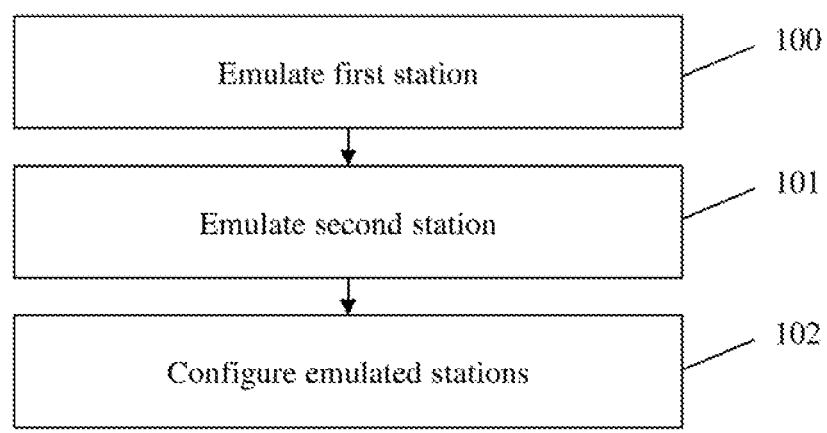
FIG. 3 shows a flow diagram illustrating a measuring method for performing an OFDMA test on a device under test, in accordance with example embodiments of the present invention.

FIG. 3 shows a flow diagram illustrating a measuring method for performing an OFDMA test on a device under test, in accordance with example embodiments of the present invention. In step 100, a first station is emulated. In step 101, a second station is emulated. In step 102, the emulated stations are configured.

In further accordance with example embodiments, the measuring device and measuring method closely correspond, whereby the features of the measuring device (e.g., as described above with reference to FIG. 1 and FIG. 2) are also valid with regard to the measuring method (e.g., as depicted in FIG. 3).

The embodiments of the present invention can be implemented by hardware, software, or any combination thereof. Various embodiments of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, or the like.

Various embodiments of the present invention may also be implemented in the form of software modules, processes, functions, or the like which perform the features or operations described above. Software code can be stored in a memory unit so that it can be executed by a processor. The memory unit may be located inside or outside the processor and can communicate date with the processor through a variety of known means.

While various embodiments of the present invention have been described above, it should be understood that they have been presented by way of example only, and not limitation. Numerous changes to the disclosed embodiments can be made in accordance with the disclosure herein without departing from the spirit or scope of the invention. Thus, the breadth and scope of the present invention should not be limited by any of the above described embodiments. Rather, the scope of the invention should be defined in accordance with the following claims and their equivalents.

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

What is claimed is:

1. A measuring device for performing an Orthogonal Frequency Division Multiple Access (OFDMA) test on a device under test, comprising:
   a first emulator adapted to emulate a first station for communicating with the device under test;
   a second emulator adapted to emulate a second station for communicating with the device under test; and
   a controller adapted to configure the first and second emulators; and
   wherein the configuration by the controller comprises configuring at least one of the first and second emulators with respect to one or more of an emulation of one or more specific applications, a deterioration of received packets, and a reply failure rate with regard to received packets,
   wherein the first emulator and the second emulator are configured to perform OFDMA communications with the device under test, and
   wherein the measuring device is adapted to monitor compliance of the OFDMA communications by the device under test.

2. The measuring device according to claim 1, wherein the device under test comprises one or more of an OFDMA communication device, a non-cellular access point, and a cellular base station.

3. The measuring device according to claim 1, wherein the device under test comprises one of an 802.11ax wireless local area network (WLAN) access point and a next generation wireless network communications node (NodeB) or eNodeB.

4. The measuring device according to claim 1, wherein the controller is adapted to configure one or more of the first emulator and the second emulator to set one or more of a service set identifier (SSID) and a media access control (MAC) address.

5. The measuring device according to claim 1, wherein the controller is adapted to configure the first emulator and the second emulator to each emulate a WLAN 11ax station, which set up connections to the device under test.

6. The measuring device according to claim 5, wherein the controller is adapted to one or more of dynamically reconfigure the first and second emulators, dynamically reconfigure the emulated WLAN 11ax stations, and force the device under test to adapt its OFDMA settings.

7. The measuring device according to claim 1, wherein the measuring device further comprises one or more additional emulators.

8. The measuring device according to claim 1, wherein the configuration by the controller comprises configuring at least one of the emulators with regard to one or more specific quality of service parameters.

9. The measuring device according to claim 8, wherein the one or more specific quality of service parameters comprise one or more of delay parameter(s) and jitter parameter(s).

10. The measuring device according to claim 1, wherein the modulation scheme comprises one of BPSK, QPSK, QAM and 1024QAM.

11. The measuring device according to claim 1, wherein the one or more specific applications comprise one or more of web browsing, email and video streaming.

12. A measuring method for performing an Orthogonal Frequency Division Multiple Access (OFDMA) test on a device under test, comprising:
    emulating, by a first emulator device, a first station for communicating with the device under test;
    emulating, by a second emulator device, a second station for communicating with the device under test;
    configuring the emulated stations;
    performing OFDMA communications with the device under test;
    monitoring compliance of the OFDMA communications by the device under test; and
    wherein the configuration of the emulated stations comprises configuring at least one of the emulated stations with respect to one or more of an emulation of one or more specific applications, a deterioration of received packets, and a reply failure rate with regard to received packets.

13. The measuring method according to claim 12, wherein the device under test comprises one or more of an OFDMA communication device, a non-cellular access point, and a cellular base station.

14. The measuring method according to claim 12, wherein the configuration of the emulated stations comprises configuring the first and second stations to each emulate a WLAN11ax station, which set up connections to the device under test.

15. The measuring method according to claim 14, wherein the configuration of the emulated stations further comprises one or more of dynamically reconfiguring the first and second stations, dynamically reconfiguring the emulated WLAN 11ax stations, and forcing the device under test to adapt its OFDMA settings.

16. The measuring method according to claim 12, wherein the configuration of the emulated stations comprises configuration of at least one of the emulated stations with regard to one or more specific quality of service parameters.

17. The measuring method according to claim 16, wherein the one or more specific quality of service parameters comprise one or more of delay parameter(s) and jitter parameter(s).

18. The measuring method according to claim 12, wherein the one or more specific applications comprise one or more of web browsing, email and video streaming.

* * * * *